(12) United States Patent
Tan

(10) Patent No.: US 6,490,353 B1
(45) Date of Patent: Dec. 3, 2002

(54) DATA ENCRYPTING AND DECRYPTING APPARATUS AND METHOD

(76) Inventor: Daniel Tiong Hok Tan, 17 Barker Road, Singapore 309892 (SG)

(*) Notice: Subject to any disclaimer, the term of this patent is extended or adjusted under 35 U.S.C. 154(b) by 0 days.

(21) Appl. No.: 09/198,238

(22) Filed: Nov. 23, 1998

(51) Int. Cl.[7] .................................................. H04K 1/02
(52) U.S. Cl. ........................ 380/37; 380/278; 380/281
(58) Field of Search .................... 380/37, 278, 281, 380/283, 44

(56) References Cited

U.S. PATENT DOCUMENTS

| | | | | |
|---|---|---|---|---|
| 4,736,423 A | * | 4/1988 | Matyas | 713/185 |
| 5,245,658 A | * | 9/1993 | Bush et al. | 380/28 |
| 5,247,576 A | | 9/1993 | Bright | 380/21 |
| 5,548,648 A | | 8/1996 | Yorke-Smith | 380/49 |
| 5,619,576 A | | 4/1997 | Shaw | 380/44 |
| 5,659,614 A | | 8/1997 | Bailey, III | 380/4 |
| 5,835,600 A | | 11/1998 | Rivest | 380/44 |
| 6,182,216 B1 | * | 1/2001 | Luyster | 713/168 |

FOREIGN PATENT DOCUMENTS

| | | |
|---|---|---|
| AU | 3516589 | 12/1989 |
| AU | 5124990 | 9/1990 |
| AU | 3905789 | 8/1991 |
| AU | 7100291 | 8/1991 |
| GB | 2188514 | 9/1987 |
| WO | 9520279 | 7/1995 |

OTHER PUBLICATIONS

Menezes, Oorschot, Vanstone, Handbook of Applied Cryptography, 1997, CRC Press LLC, pp. 224, 229, and 230.*
"A Variable Size Core for Block Cipher Crytography—Cipher Blocks of Arbitrary Size with Good Data Diffusion—A *Ciphers By Ritter* Page" by Terry Ritter; pp. 1–11.
"Ritter's Crypto Glossary and Dictionary of Technical Cryptography—Technical Cryptographic Terms Explained"—Hyperlinked definitions and discussions of many cryptograhic, mathematic, logic, statistics, and eelectronics terms used in cipher construction and analysis—A *Ciphers By Ritter* Page, Current Edition Jan. 19, 1999; pp. 1–89.

* cited by examiner

Primary Examiner—Thomas R. Peeso
(74) Attorney, Agent, or Firm—Baker Botts LLP

(57) ABSTRACT

A crytography method of encrypting data is disclosed. The method provides for creating or selecting a master key. Thereafter, the data to be encrypted is segmented into data blocks of equal or variable lengths. For each data block a sub-key of an arbitrary starting position is selected from a pre-defined set of arbitrary positions and of matched or unmatched length from the master key, where the master key length is selected from a pre-defined set of arbitrary lengths. Having acquired the sub-key for each data block, each data block is encrypted using its sub-key and an encryption algorithm.

23 Claims, 7 Drawing Sheets

User Name
| B | o | b |
Random number
| 2 | C |
Securithm numbers
| 3 | 45 | 79 | 42 | 99 | 34 | 1 | 81 | 0 | 45 | ... | 49 |
|---|----|----|----|----|----|---|----|---|----|-----|----|
| 0 | 1  | 2  | 3  | 4  | 5  | 6 | 7  | 8 | 9  | ... | 19 |
Sub-key positions
| 89 | 32 | 0 | 118 | 4 | 97 | 43 | 123 | 66 | 0 | ... | 78 |
|----|----|---|-----|---|----|----|-----|----|---|-----|----|
| 0  | 1  | 2 | 3   | 4 | 5  | 6  | 7   | 8  | 9 | ... | 19 |
Sub-key lengths
| 8 | 1 | 2 | 7 | 3 | 7 | 1 | 5 | 4 | 8 | ... | 6 |
|---|---|---|---|---|---|---|---|---|---|-----|---|
| 0 | 1 | 2 | 3 | 4 | 5 | 6 | 7 | 8 | 9 | ... | 19 |
Figure 2
Sub-key positions
| 89 | 32 | 0 | 118 | 4 | 97 | 43 | 123 | 66 | 0 | ... | 78 |
|----|----|---|-----|---|----|----|-----|----|---|-----|----|
| 0  | 1  | 2 | 3   | 4 | 5  | 6  | 7   | 8  | 9 | ... | 19 |
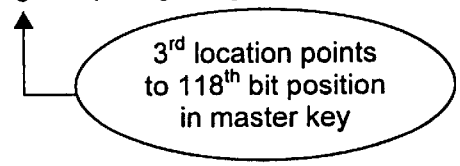
3rd location points to 118th bit position in master key
Sub-key lengths
| 8 | 1 | 2 | 7 | 3 | 7 | 1 | 5 | 4 | 8 | ... | 6 |
|---|---|---|---|---|---|---|---|---|---|-----|---|
| 0 | 1 | 2 | 3 | 4 | 5 | 6 | 7 | 8 | 9 | ... | 19 |
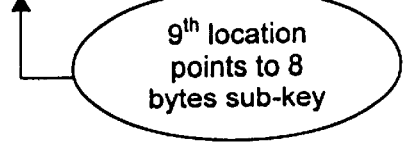
9th location points to 8 bytes sub-key
Figure 3

DATA ENCRYPTING AND DECRYPTING APPARATUS AND METHOD

This invention relates to data encrypting and decrypting apparatus and to data encrypting and decrypting methods. It relates particularly but not exclusively to cryptographic systems which use variable keys, systems which use variable length data blocks, and systems which use variable encrypting and decrypting algorithms.

BACKGROUND OF THE INVENTION

Cryptography typically involves converting data from an understandable form into an encrypted form which cannot be understood by persons other than the intended recipient, and transmitting the data to the recipient who deciphers the data. It is useful in many applications, including confidential business communications, Internet commerce, military intelligence, and electronic financial services. In each of these applications, it is essential that communications be secure against eavesdropping and unauthorised access.

Encryption of data is usually accomplished by applying an algorithm to that data, and decryption is accomplished by applying the inverse of that algorithm. In many cases, the encryption step involves a "pass phrase" or key, which is combined with the data according to the algorithm to create the encrypted message, so that it is necessary for the recipient to know both the key and the inverse algorithm in order to decrypt the message.

Cryptography typically serves two purposes. One of these is to ensure that only the intended recipient receives a secret message. This is accomplished by ensuring that only the intended recipient has the key and inverse algorithm necessary to decrypt the message. The other purpose is "message authentication", which provides assurance to the recipient that the message really did come from the sender. This is accomplished by ensuring that only the sender has the key and algorithm necessary to encrypt messages which make sense when decrypted by the key and inverse algorithm.

One common form of cryptography is public key cryptography, as described in U.S. Pat. Nos.4,218,582 and 4,200,770 by Martin E Hellman, Bailey W Diffie and Ralph C Merkle. This involves finding a pair consisting of an algorithm and an inverse algorithm, for which it is impossible (or "computationally infeasible") to determine the inverse algorithm from the original algorithm. One set of such algorithm/inverse pairs is known as the RSA algorithm and is described in U.S. Pat. No. 4,405,829 by Ronald L Rivest, Adi Shamir and Leonard M Adleman. The person who creates the algorithm/inverse pair distributes the algorithm publicly but keeps the inverse secret. Anyone can then send a secret message to that person by encrypting the message with the algorithm (or "public key"). Only the person with the inverse algorithm (or "secret key") can decrypt any such message. Conversely, message authentication can be achieved if the person encrypts a message with the secret key. Any other person can use the public key to decrypt the message and confirm that it came from the secret key holder.

Public key cryptography is susceptible to "spoofing", in which a person pretends to be someone else, and sends out a public key under that other person's name. Moreover, because the algorithm/inverse pairs tend to be complex, this method of cryptography typically requires considerable computing resources and is comparatively slow.

Another common type of cryptography is known as DES. This is a block cipher which is the US Data Encryption Standard. A block cipher involves partitioning the message into blocks, perhaps with some padding to fill out the final block, and then encrypting and transmitting each block. DES uses a 64-bit block with a 56-bit key. DES is one of many different types of secret key cryptography, which depends upon the secret key being sent by a secured channel from the transmitter to the receiver so that it is kept secret from the rest of the world.

There are various different ways in which a person may attempt to break an encryption code without first having had access to the key and/or algorithm. One of these approaches is known as the "codebook attack", and it involves building a codebook of all possible transformations between original message text and encrypted data. This approach can work if there are patterns in the encrypted data which correspond with patterns in the message text. A codebook attack can in some instances be effective against DES cryptography.

SUMMARY AND OBJECTS OF THE INVENTION

An object of the present invention is to provide a new cryptographic method. Another object is to provide a cryptographic method which is less computationally intensive than methods based on current methods like the DES and RSA algorithms. Another object is to provide a cryptographic method which is more secure and flexible. Another object is to facilitate the transmission of data securely in real time with minimum delay or latency.

According to a first aspect of the invention, a method of encrypting data includes the following steps:
(a) creating or selecting a master key;
(b) segmenting the data into data blocks of equal or variable lengths;
(c) for each data block selecting a sub-key of arbitrary starting position and of matched or unmatched length from the master key; and
(d) encrypting each data block using its sub-key and a selected or associated encryption algorithm.

When an encrypted message is to be sent to a recipient, it is preferred that the master key be kept secret and provided to the recipient by a secured channel. However, this is not essential, as the master key can be public if the sub-keys or sub-key selection process are kept secret.

The master key may be created or selected in any suitable manner. It may consist of a pass phrase, or it may be generated from a pass phrase according to an algorithm which is available to both message sender and receiver.

The master key or pass phrase may also be a file or file series—text, graphic, image, audio, movie, multimedia or any binary file. Where the master key is a binary file, the file may be one that is in private, restricted, limited or closed distribution. This file might be a file that is linked to a user or group, such as a binary file containing finger-print, voice, image or other user-specific and/or user property information.

In cases where the binary file is readily and publicly available, it may be in the form of a public key or pass phrase, as described above. It can also be a multimedia file, containing data for a movie, video, image, audio, graphics, or a large text file or a non-alphabetic-based language file (e.g. Japanese, Chinese, Middle Eastern, etc.) represented in a format that is readable to the system. The binary file can also be a common file that is part of the operating system or an application program.

Binary files of these types, although easily accessible, typically are large in volume (Kbyte to Mbytes). They can be downloaded from a site on the network or transferred via some other means, secured or otherwise. This downloading might be done on a periodic basis—monthly, weekly, daily or even hourly, or aperiodically, as and when needed.

The master key, if added security be needed, can be amended or replaced in the midst of its use. This event might be triggered by an algorithm.

The step of segmenting data into blocks may involve separating the data into equally-sized blocks, as occurs in the DES method, or it may involve separating the data into data blocks of variable arbitrary length. The use of variable length data blocks is preferred because it increases the degree of difficulty in attacking the encryption system, particularly if the length of each data block when encrypted bears no relationship to the length of the data block before encryption.

Sub-keys may all be of the same length, but it is preferred for the sake of maximising security that they be of variable length. They may be a selection of contiguous bits from the master key, or they may comprise non-contiguous bits determined according to a pre-arranged pattern, such as every second bit from the sub-key start position, or skipping every third byte, etc. It is preferred for the sake of convenience that sub-keys be comprised of contiguous bits.

The step of selecting a sub-key from the master key may involve selecting a sub-key starting position from a pre-defined set of arbitrary positions and selecting a sub-key length from a pre-defined set of arbitrary lengths. Thus, for example, there may be a table of randomly-selected starting positions and a table of randomly-selected lengths. Sub-key selection may proceed simply by moving through the table in linear sequence. Variations include changing sub-key only on every second or third data block, skipping every second table entry, etc. In arrangements where sub-key selection proceeds in order through a pre-defined table, provided the message sender and receiver already both have the same tables, there is no need for communicating the particular selections for starting positions and lengths for each data block. Alternatively, instead of moving through the table in sequence, sub-key selection may involve choosing random numbers n and m, where n designates the $n^{th}$ entry in the first table and m designates the $m^{th}$ entry in the second table. In this arrangement, the tables form part of a seed (preferably secret) which has previously been created and shared between message sender and recipient. The message sender can let the receiver know the sub-key simply by specifying (n,m), and the receiver extracts the sub-key from the master key by locating the $n^{th}$ entry in the starting position table and the $m^{th}$ entry in the length table from the seed, and applying those values to the master key.

A sub-key start position is an indicator of the number of bits or bytes (or other data units) which are ignored in the master key before data is taken for the sub-key. The sub-key length is a measure of the number of bits or bytes (or other data units) which are taken from the master key for use in the sub-key, starting from the sub-key start position. If a sub-key length is longer than the amount of data in the master key after the sub-key start position, the master key can "wrap", so that the remaining data for the sub-key is obtained from the start of the master key.

In the invention as it has been described so far, different data blocks are encrypted by reference to different sub-keys. Security can be further enhanced by also using different algorithms for encrypting different data blocks. This makes attacks particularly difficult because the attacker must identify not only a separate sub-key for each data block but also a separate algorithm. The algorithms may be any suitable types of bit manipulation, processing or encryption algorithms. An algorithm might alternatively or additionally effect an action such as a change or amendment in the master key (which may be conditional or otherwise, in part or in whole), with the change or amendment occurring during the encryption/decryption process.

A set of algorithms may be identified and stored in a randomly ordered table in a seed together with a sub-key start position table and a sub-key length table, as described above. Different or replicated algorithms may be used for different data blocks simply by progressing through the table in linear or parallel fashion one at a time, or in some predetermined pattern such as changing algorithm for every third data block or skipping every fourth algorithm. Alternatively, and more preferably, different algorithms are selected from the table in an arbitrary order. In this arrangement, where the seed has earlier been communicated to the receiver via a secured channel, the message sender can identify the sub-key and algorithm for each data block in the simple format (n,m,p) where n indicates the $n^{th}$ entry in the sub-key start position table, m indicates the $m^{th}$ entry in the sub-key length table, and p indicates the $p^{th}$ entry in the algorithms table.

Where a seed is used as well as a master key, it is only necessary for either the seed or the master key to be kept secret. The master key could be made public, or readily available to the public, such as an image or movie archive file from a widely accessible web site, and persons other than the intended recipient would still be unable to determine the particular sub-keys and/or algorithms used in encrypting a particular message. Alternatively, the seed could be made public, and persons other than the intended recipient would be unable to determine the master key. For increased security, it is preferred that both the master key and the seed be kept secret.

According to a second aspect of the invention, a method of encrypting data includes the following steps:

(a) creating or selecting a master key;

(b) segmenting the data into data blocks of equal or variable lengths;

(c) for each data block selecting an encryption algorithm;

(d) encrypting each data block using its encryption algorithm.

As has been described above, the encryption algorithm selected for each data block may be selected from a pre-defined set or sub-set of suitable algorithms. The pre-defined set may consist of a table, so that the $p^{th}$ algorithm in a table can be identified in a message simply as (p), without disclosing to an interceptor any information about the nature of the algorithm itself. Such a table preferably has been communicated securely previously, or forms part of a seed which has previously been communicated secretly between the message sender and receiver. Alternatively, the seed may be communicated via a secret communication channel after the actual message has been communicated, or, less preferably, the seed may be communicated as part of the message transmission.

According to a third aspect of the invention, a method of communicating data in a secure manner from a message transmitter to a message receiver includes the following steps:

(a) creating a seed which includes a set of arbitrary sub-key start positions, a set of arbitrary sub-key lengths, and a set of suitable encryption algorithms;

(b) communicating the seed to the message receiver over a secured channel;

(c) creating or selecting a master key;

(d) communicating the master key to the message receiver over a secured channel;

(e) dividing the data into data blocks of arbitrary equal or variable length;

(f) for each data block, selecting from the seed a sub-key start position, a sub-key length (which may be matched or unmatched in length to the corresponding data block), and an encryption algorithm;

(g) using the sub-key start position and length for each data block to derive from the master key a sub-key for that data block;

(h) encrypting each data block using that data block's sub-key and encryption algorithm;

(i) transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

The seed may be communicated to the message receiver over any suitable type of secured channel. One way of doing this is over a public key cryptography system. Given that many messages may be sent using the one seed, the additional computing resources used in sending the seed in this manner may be justified. Another way of doing this is via a physical delivery by a courier of the seed on computer storage media or in printed form. It will be appreciated that there are numerous other possible types of secured channels.

The master key may also be communicated over any suitable type of secured channel. It is especially preferred, for the sake of added security, that different secured channels, or at least different times of delivery, be used for the master key and the seed. In one suitable arrangement, the master key may be based on a pass phrase. The pass phrase may be combined with part or all of the seed according to a predetermined algorithm to generate the master key. In this case, the secured channel chosen to communicate the pass phrase may be a telephone call, with the pass phrase being spoken.

According to a fourth aspect of the invention, apparatus for encrypting data includes:

(a) a data block creating processor, which accepts a stream of data as its input, and outputs the data in the form of blocks;

(b) a random selector, which selects a sub-key start position and a sub-key length;

(c) a sub-key selector, which accepts as inputs a master key, the sub-key start position and sub-key length, and derives from these a sub-key;

(d) an encryption processor, which accepts as inputs a sub-key and a data block (not necessarily of matched length), and uses the sub-key to encrypt the data block according to an encryption algorithm.

The data block creating apparatus may operate in any suitable manner. It may create data blocks of fixed or random lengths, with random lengths being especially preferred, for the reasons discussed above.

The random selector may operate in any suitable manner. It may select a sub-key start position and sub-key length directly, or, more preferably, it may select these by randomly selecting table entry numbers, where selections of predefined suitable start positions and lengths have previously been entered in randomly-ordered tables. Thus the sub-key can be defined concisely by two table entry numbers, which themselves bear no resemblance to the sub-key start position or length values.

It is preferred that the random selector also selects an encryption algorithm from a group of suitable algorithms. In such arrangements, the encryption processor may accept the encryption algorithm as one of its inputs. Alternatively, the apparatus may further include a plurality of encryption processors, each embodying an encryption algorithm, wherein the random selector also selects an encryption processor, with the selected encryption processor being the processor which encrypts the data block according to its encryption algorithm.

According to a fifth aspect of the invention, apparatus for encrypting data includes:

(a) a data block creating processor, which accepts a stream of data as its input, and outputs the data in the form of blocks;

(b) a plurality of encryption processors, each embodying an encryption algorithm; and (c) a random selector, which selects one of the encryption processors, so that the selected encryption processor encrypts the data block according to its encryption algorithm.

According to a sixth aspect of the invention, apparatus for encrypting data includes:

(a) a data block creating processor, which accepts a stream of data as its input, and outputs the data in the form of blocks;

(b) a random selector, which selects an encryption algorithm from a group of suitable algorithm;

(c) an encryption processor, which accepts as inputs the encryption algorithm and the data block, and uses the encryption algorithm to encrypt the data block.

According to a seventh aspect of the invention, apparatus for communicating data in a secure manner from a message transmitter to a message receiver, includes:

(a) a data block creating processor, which accepts a stream of data as its input, and outputs the data in the form of blocks;

(b) a random selector, which selects a sub-key start position, a sub-key length, and an encryption algorithm;

(c) a sub-key selector, which accepts as inputs a master key, the sub-key start position and sub-key length, and derives from these a sub-key;

(e) an encryption processor, which accepts as inputs a sub-key, an encryption algorithm and a data block, and uses the sub-key to encrypt the data block according to the encryption algorithm; and (f) apparatus for transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

According to an eighth aspect of the invention, apparatus for communicating data in a secure manner from a message transmitter to a message receiver, includes:

(a) a data block creating processor, which accepts a stream of data as its input, and outputs the data in the form of blocks;

(b) a plurality of encryption processors, each embodying an encryption algorithm, and each of which accepts as inputs a sub-key and a data block, and uses the sub-key to encrypt the data block according to its algorithm;

(c) a random selector, which selects, for each data block, a sub-key start position, a sub-key length, and an encryption processor;

(d) a sub-key selector, which accepts as inputs a master key, the sub-key start position and sub-key length, and derives from these a sub-key;

(e) apparatus for transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

It will be appreciated that the invention is suitable for the generation of digital signatures. A digital signature is a portion of code appended to a digital document or used to encode the document or a part thereof, in order to prove to the recipient that the document is a genuine communication from the person or organisation who applied the digital signature. If only the receiver and the sender have access to a secret encryption and decryption process, and the receiver receives a validly encoded message, the receiver can be certain that the message was sent by the sender. Digital signatures are important in fields such as electronic commerce, where it is necessary to make legally binding electronic transactions.

The invention will hereinafter be described in greater detail by reference to the attached drawings which show an example form of the invention. It is to be understood that the particularity of those drawings does not supersede the generality of the preceding description of the invention.

BRIEF DESCRIPTION OF THE DRAWINGS

FIG. 2 is a schematic illustration of the contents of a seed for use in the process of FIG. 1.

FIG. 3 is an explanatory illustration of the operation of the sub-key parts of the seed of FIG. 2.

DESCRIPTION OF THE PREFERRED EMBODIMENT

The invention is based on a principle of "hopping" sub-keys and/or security algorithms or "securithms". A securithm is defined as an algorithm or software program that perroms some bit manipulation or processing.

A securithm can be a simple function like "reverse all bits", "rotate left by three bits", "fill/pad with 5 bits of 1's", "no change/copy", etc. The sub-key, in this instance, is not used as an input to the encryption process.

In another case, a securithm might use the sub-key as an input to perform an operation on the data block, as in using boolean functions like AND, OR, XOR, etc. In another case, a securithm might involve more single complex functions, such as "IF the first two bits are 00, THEN . . . , ELSE . . . " or "activate composite key selection". In another case, a securithm might be a combination of some of the above functions.

The choice of complexity of the securithms might be determined by the user based on the security and sensitivity level of the data in part, or in whole, purpose of the communication, or other factors or policies.

A pool of securithms may be created. Depending on the requirements of the application, users or policy, a library of them may be arbitrarily selected. The ordering of the securithms in this selection may be pre-arranged and changed dynamically as and when required by the parties concerned. Conceivably, securithms may be repeated with unique securithm numbers.

The underlying encryption process is a modular one, such that data which is to be transmitted in a secret message is broken up into components and essentially independent "modular" encryption is applied to each component. Whereas many encryption systems rely on complex encryption algorithms which require extensive computer processing resources, the inventive system can use many different simple securithms and/or many different simple sub-keys in order to create encrypted messages which have a similar or greater degree of security. The embodiment described below is a system in which both securithms and sub-keys are changed for each data block of the secret message.

Figure 1:
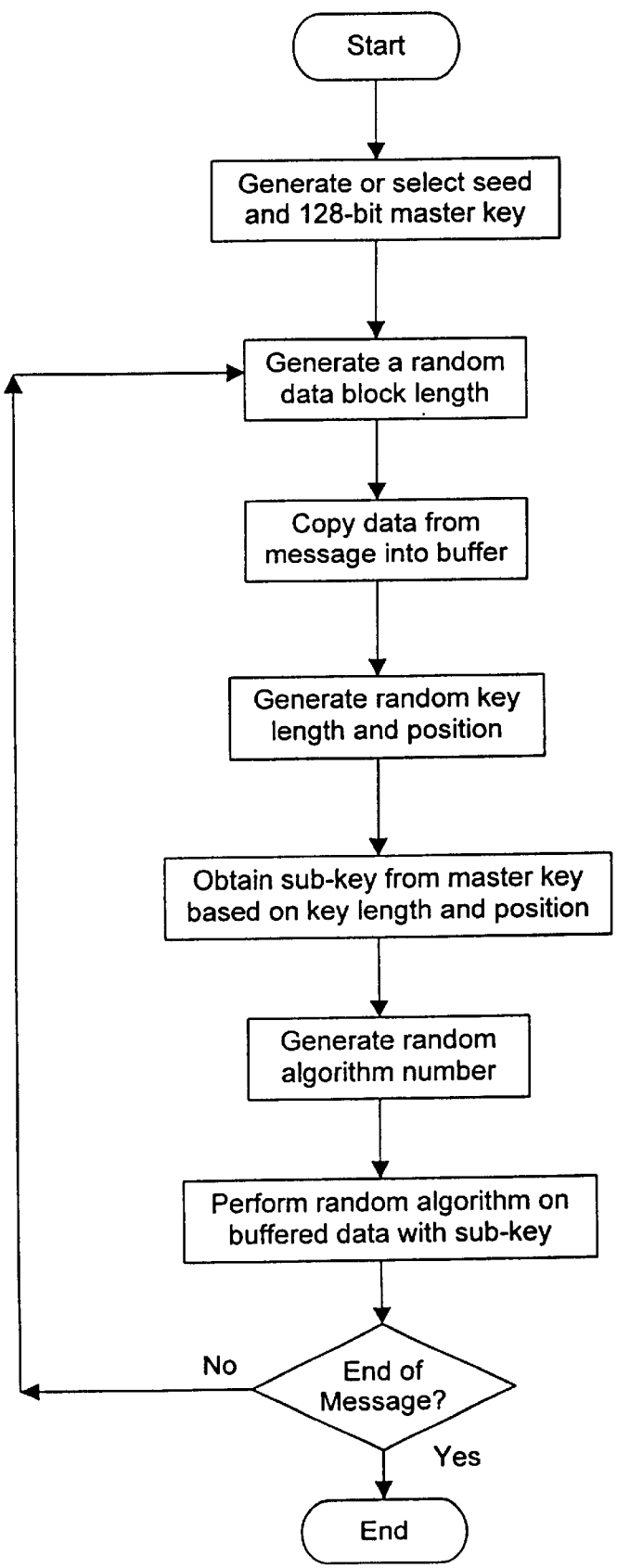
FIG. 1 is a flow chart of an encryption process according to an embodiment of the invention.

Alice wants to send a message to Bob. She does not want any other person to intercept the message and learn the message's content. Accordingly, she decides to encrypt the message according to the inventive method. An overview of the steps involved in the encryption process is given in FIG. 1. Firstly, a seed and a master key are generated. Alternatively, one or more binary files can be selected, as described above. Then a random length for a data block is generated. Next, a portion of the message having that length is copied into a buffer. Then a random sub-key length and a random sub-key start position are generated. These are used to extract a sub-key from the master key. A random securithm number is generated. The randomly selected algorithm is performed on the buffered data using the sub-key. Finally, when all the data in the message has been processed, the encryption finishes. Otherwise, the process repeats from the step of generating a random length for a data block.

The first step involves selecting or generating a seed to be shared between Alice and Bob.

In the case of selecting a seed, the seed might be a file that is already available, like a public key, a binary document or a binary file from a file server, archive server, dictionary, data repository, web server, etc. The file might be one that is update frequently, like a page at an active news web site.

Alice and Bob can both agree on the file and/or the site. This approach overcomes some of the issues of key management, key security and its secured delivery.

The selected file can then be converted and processed into a format containing numeric data that is used by the process described below.

In the other option, a seed is generated to be shared between Alice and Bob, if they do not already have one. The particular seed generated may have the following components:

User name (in this case, "Bob")

Random number 20 securithm numbers 20 sub-key start positions 20 sub-key lengths This seed is to be shared between Alice and Bob. As the seed is to be developed by Alice, she specifies "Bob" as the "User name" parameter. Other seeds can be developed for use in sending messages from Alice to other persons or groups of persons, with different "User name" parameters in each case. For ultra-high-security messages, Alice and Bob can share multiple time-dependent seeds, with the time dependency being identified in the "User name" parameter, although it is envisaged that in standard communication Alice and Bob will use the same seed for many communications.

The random number is an optional number which can be combined, according to a pre-determined algorithm, with a pass phrase in order to generate the master key used for each encryption session. Thus, in order to provide a master key, Alice simply thinks up a pass phrase and uses that to generate the master key. This means that the master key itself is never actually communicated between Alice and Bob, so that the encryption system cannot easily be broken simply by intercepting the pass phrase. In fact, the master key never has a separate existence; it merely is created from the pass phrase and seed during the encryption and decryption processes.

In this example, the seed includes 20 securithm numbers. More securithm numbers could be included for greater security. Each of the 20 securithm numbers might be selected at random from a set of say 100 possible securithms, each of which is allocated a number between 0 and 99. Twenty of these 100 numbers are selected at random for use in the seed.

The seed also includes 20 random sub-key start positions and 20 sub-key lengths. In the present example, the master key is 128 bits in length, so each of the sub-key start positions can have any value from 0 to 127. In the present example, sub-key length is expressed in units of bytes and takes a random number from 1 to 8. Sub-key length can alternatively be expressed in other forms such as bits and nibbles.

FIG. 2 shows the information contained in a seed. It shows how the 20 securithm numbers, 20 sub-key positions and 20 sub-key lengths are stored with random numbers.

Sub-key values may be: (a) absolute values in a series; (b) values that represent an off-set; or (c) look-up table/index table entries that point to another local series of numbers which provide the actual position and securithm numbers.

The actual encryption process begins with dividing the secret message which is to be communicated to Bob into data blocks of random lengths, or equal lengths, or otherwise. This can be done by generating random numbers between 1 and 8, and creating data blocks having a length of between 1 and 8 bytes, depending on the random number generated. This process continues (possibly interspersed between the other steps described below) until all of the message has been placed in data blocks.

Next, for the first random-length data block, a pair of random numbers is generated to serve as pointers to obtain a sub-key start position and sub-key length from the seed. Each number is in the range 0 to 19, as there are 20 sub-key start positions and 20 lengths in the seed.

Figure 4:
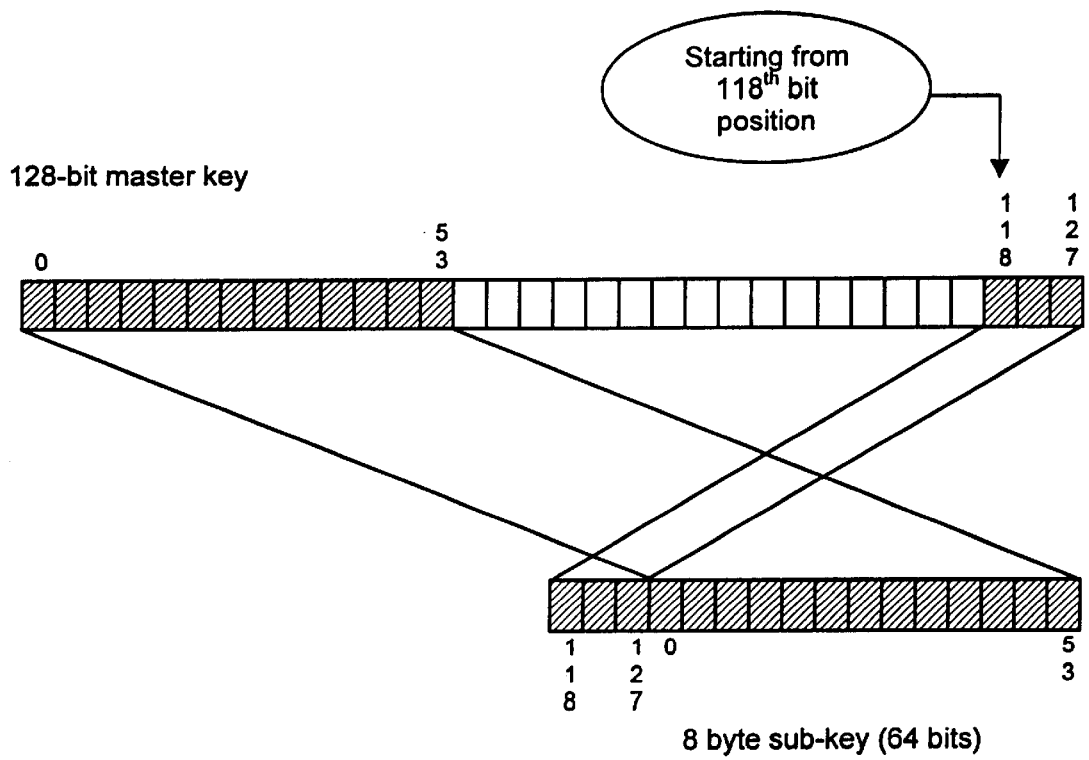
FIG. 4 illustrates the extraction of a sub-key from a master key in the process of FIG. 1.

Assume that the sub-key random numbers for the first data block are 3 for sub-key start position and 9 for sub-key length. This means that the sub-key start position should be the third number in the sub-key position table, and the sub-key length should be the ninth entry in the sub-key length table. FIG. 3 shows the two tables with the $3^{rd}$ position entry ($118^{th}$ bit) and $9^{th}$ length entry (8 bytes) entries marked. This means that the sub-key is defined by starting at the $118^{th}$ bit on the master key, and taking 8 bytes (or 64 bits) of data. FIG. 4 shows that the amount of data in the 128-bit master key between the $118^{th}$ bit and the end is only 10 bits, so the remaining 54 bits in the sub-key are extracted from the start of the master key, between bit 0 and bit 53.

Figure 5:
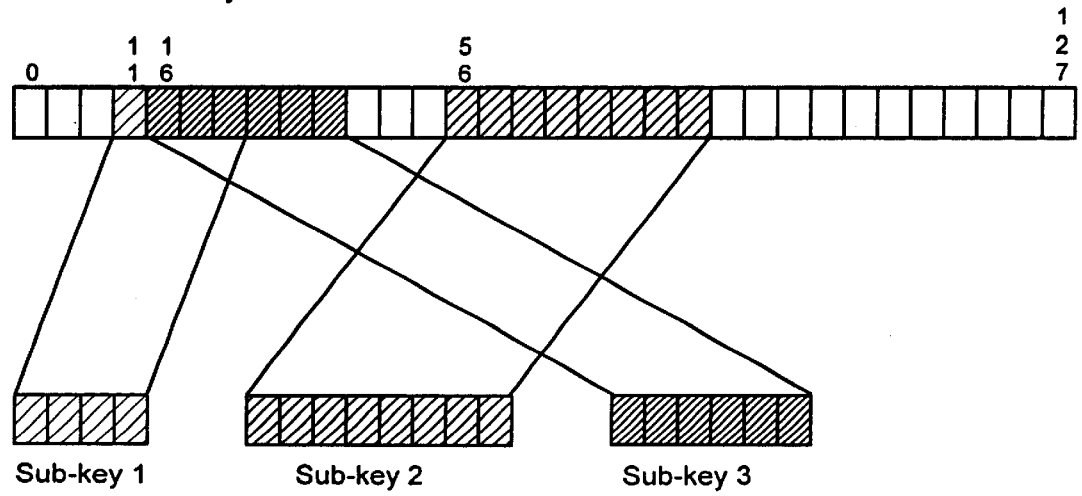
FIG. 5 illustrates the principle of multiple "hopping" sub-keys extracted from the master key in the process of FIG. 1.
Figure 6:
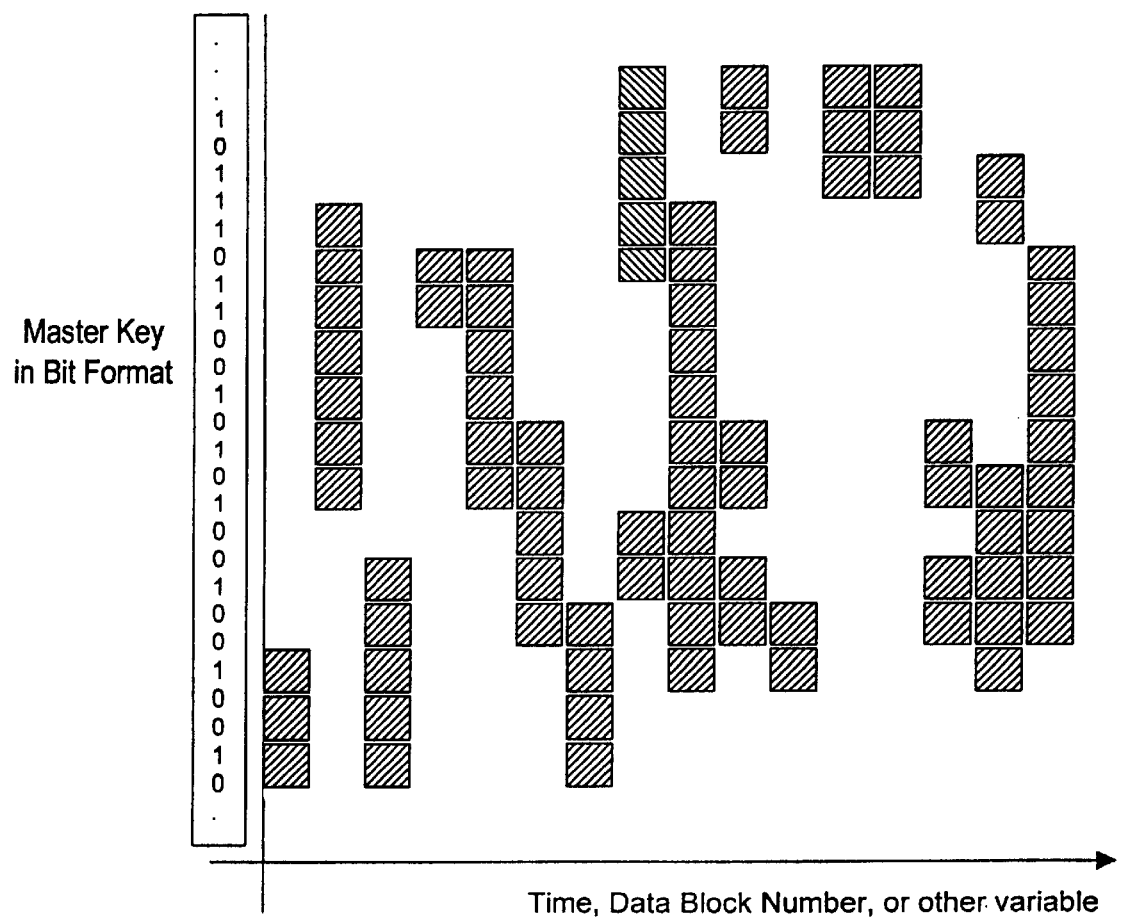
FIG. 6 is a further graphical illustration of multiple "hopping" sub-keys extracted from the master key.

For the second, third and fourth data blocks, the sub-key numbers might relate to sub-keys having start bit position 11 and length 2 bytes, start bit position 56 and length 4 bytes, and start bit position 16 and length 3 bytes, respectively. FIG. 5 shows diagrammatically the manner in which the sub-keys are derived from the master key. FIG. 6 provides a further diagrammatic illustration of the derivation of sub-keys. At the left of the chart is a vertical bar representing the master key. To the right of the master key is a shorter dark bar, representing the sub-set of the master key which makes up the first sub-key. Immediately to the right of the first key is another dark bar representing the second sub-key, and so on.

It will be observed from FIG. 6 that, while most of the sub-keys consist exclusively of contiguous bits from the master key, some sub-keys are derived from two or more non-contiguous sections of the master key. There are no restrictions in this regard. For the sake of convenience it might be preferred that sub-keys be composed of contiguous master key bits.

Figure 7:
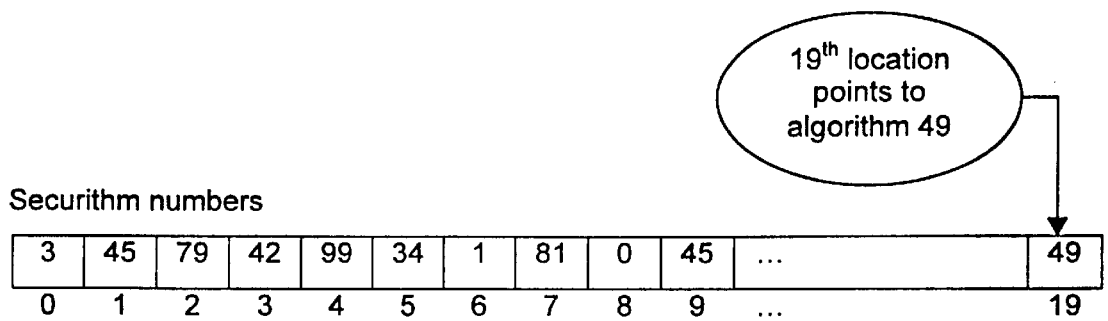
FIG. 7 is an explanatory illustration of the operation of the securithm numbers part of the ed of FIG. 2.
Figure 8:
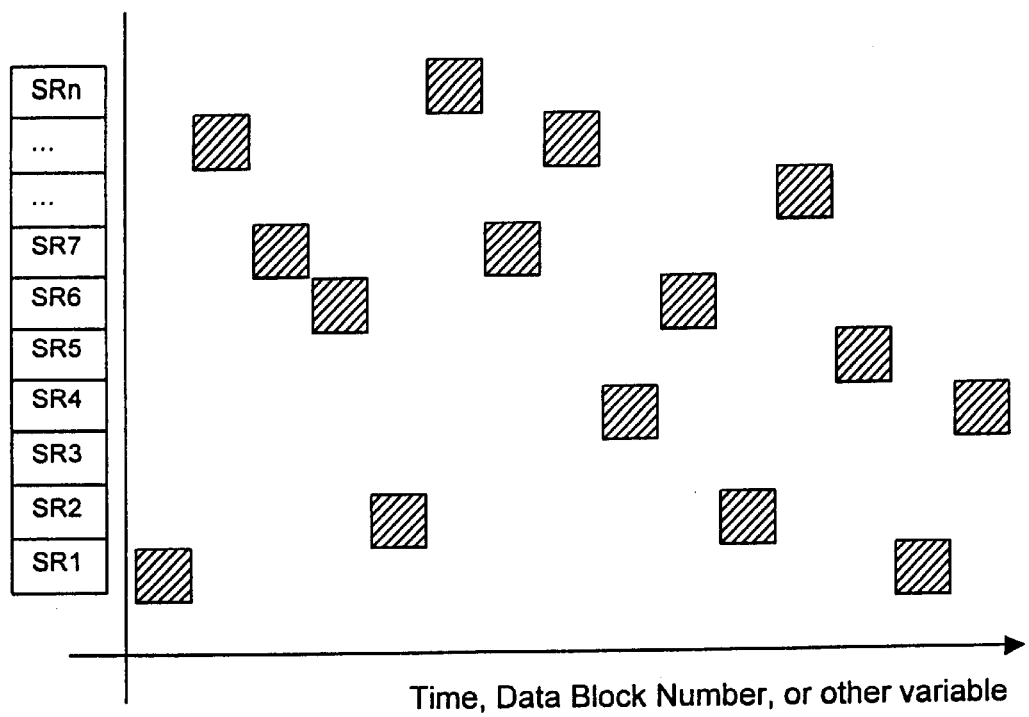
FIG. 8 is a graphical illustration of multiple "hopping" securithms in the process of FIG. 1.

After the sub-key for the first data block has been obtained, a securithm number for that data block is also determined. This is done by generating a random number between 0 and 19, as there are 20 securithm numbers in the seed. Suppose that the random number generated is 19. From FIG. 7 it can be seen that location 19 in the seed points to securithm 49. Securithm 49 could be a simple XOR, or NOT, or rotation, or shift function, or other similar function or combination of functions. FIG. 8 diagrammatically illustrates hopping between algorithms in the same way that FIG. 6 illustrates hopping between sub-keys.

Next, encryption is performed on the first variable length data block using its sub-key and securithm which have been selected according to the process described above. After the first data block has been encrypted, the whole procedure is repeated for each other data block until the whole message is encrypted. The overall encryption process is relatively fast due to the use of simple algorithms, requiring only a few machine instructions.

Once the message has been encrypted, Alice sends the encrypted message to Bob. She may transmit the pass phrase via a different secured channel, such as by speaking it over the telephone, or through secured hand delivery and receipt. If an eavesdropper has managed to obtain the ciphertext, he would not be able to decrypt it without the correct seed and pass phrase; moreover, he does not know the securithm sequence, which can be configured by pre-arrangement.

After Bob has received the ciphertext from Alice, he uses the seed and pass phrase to decrypt the message. Bob enters the pass phrase to generate the master key from the random number retrieved from the seed. The parameters used for data block length, sub-key start position, sub-key length and securithm number are identical to those used in the encryption process.

ENCRYPTION EXAMPLE

Suppose Alice has the following secret message to encrypt and send to Bob: "Hi Bob, how are you?" This message is 20 bytes in length (because each letter, space or punctuation character counts for one byte of data). The following tables show the information obtained during the encryption process:

TABLE 1

| H | i | , | | B | o | b | | h | o | w | | a | r | e | | y | o | u | ? |
|---|---|---|---|---|---|---|---|---|---|---|---|---|---|---|---|---|---|---|---|

TABLE 2

| | | | |
|---|---|---|---|
| Data Block | 1 | Key Position | 98th bit |
| Data Length | 7 bytes | Key Length | 6 bytes |
| Algorithm | #70 - Reverse & rotate left by 3 & XOR | | |
| Sub-Key | 38 4F 93 A8 CF 71 | | |
| Data (before) | 48 69 20 42 6F 62 2C - "Hi, Bob" | | |
| Data (after) | 59 5C E8 BA CE 3A 7A | | |

TABLE 3

| | | | |
|---|---|---|---|
| Data Block | 2 | Key Position | 15th bit |
| Data Length | 5 bytes | Key Length | 1 byte |
| Algorithm | #91 - XOR & reverse | | |
| Sub-Key | 43 | | |
| Data (before) | 20 67 6F 77 20 - "how" | | |
| Data (after) | 63 34 2C 2B 63 | | |

TABLE 4

| | | | |
|---|---|---|---|
| Data Block | 3 | Key Position | 102nd bit |
| Data Length | 4 bytes | Key Length | 6 bytes |
| Algorithm | #91 - XOR & reverse | | |
| Sub-Key | 4F 93 A8 CF 71 21 | | |
| Data (before) | 61 72 65 20 - "are" | | |
| Data (after) | EF CD E1 2E | | |

TABLE 5

| | | | |
|---|---|---|---|
| Data Block | 4 | Key Position | 63rd bit |
| Data Length | 2 bytes | Key Length | 4 bytes |
| Algorithm | #3 - Rotate left by 2 & XOR | | |
| Sub-Key | E5 17 0C CE | | |
| Data (before) | 79 6F - "yo" | | |
| Data (after) | 00 AA | | |

TABLE 6

| | | | |
|---|---|---|---|
| Data Block | 5 | Key Position | 40th bit |
| Data Length | 2 bytes | Key Length | 5 bytes |
| Algorithm | #23 - Reverse & rotate left by 6 & XOR | | |
| Sub-Key | 82 98 0F CA 2E | | |
| Data (before) | 75 3F - "u" | | |
| Data (after) | 4D C5 | | |

The whole message is broken down into several data blocks, in this case five different blocks, as shown by the dark vertical lines in Table 1 above. Each of Tables 2 to 6 show the various parameters and information applying to one of the data blocks during the encryption process. In the tables, the following information is provided:

Key Position is the data bit number in the master key which forms the starting bit for the sub-key Key Length is the number of contiguous bytes taken from the master key, beginning at starting bit, to form the sub-key Sub-Key is the actual data of the sub-key, obtained from the master key, in hexadecimal format Algorithm is the number, and a description of, the securithm selected for that particular data block Data Length is the number of bytes of data from the message to be encrypted in that particular data block Data (before) shows the data before encryption in hexadecimal format Data (after) shows the data after encryption in hexadecimal format As can be seen from Tables 2 to 6, each data block encryption process may use different data length, sub-key and securithm. These are due to three characteristic features of the invention, key hopping, algorithm hopping, and variable length data blocks.

Figure 9:
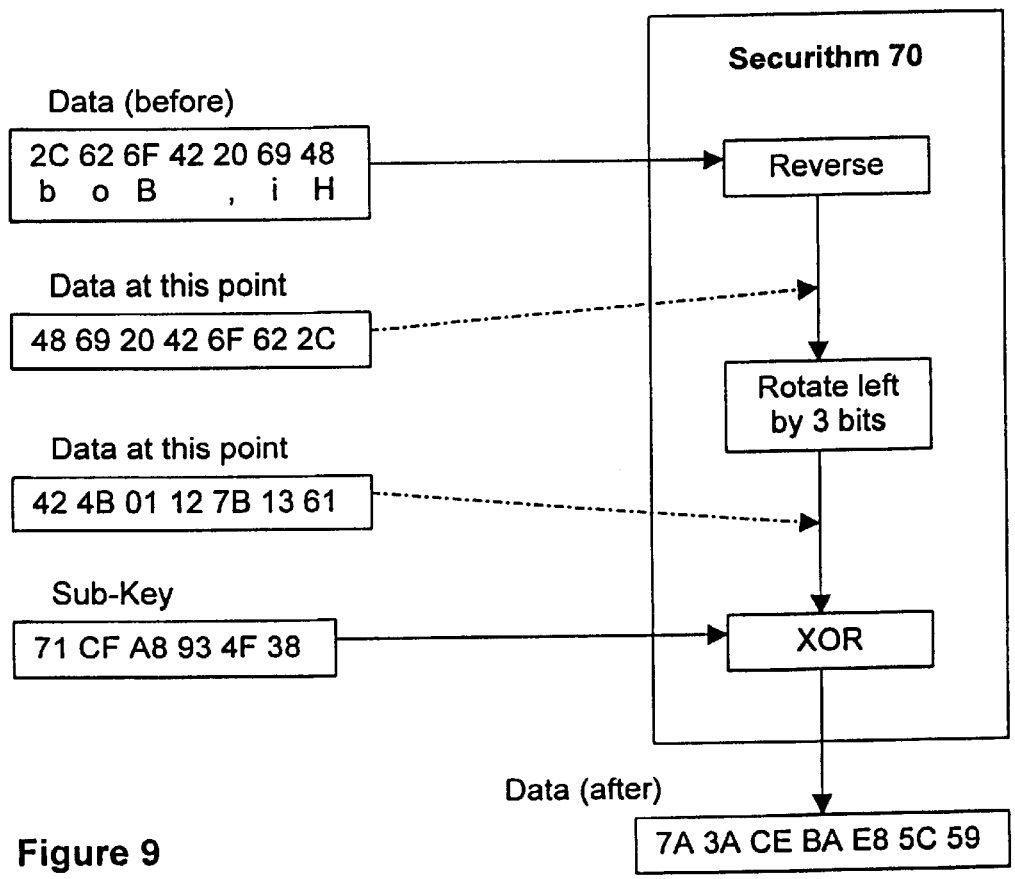
FIG. 9 is a step-by-step illustration of the encryption of one data block in the process FIG. 1.

FIG. 9 provides a detailed step-by-step summary of the encryption process for the first data block. A detailed examination of Table 2 in conjunction with FIG. 9 provides the following observations:

Key length—6 bytes

Key position—98th bit position

Hence the sub-key is obtained from the master key starting at the 98th bit position and is 6 bytes long. The sub-key is 38 4F 93 A8 CF 71, in hexadecimal format Data length—7 bytes Algorithm is securithm number 70, which is a combination of three simple instructions—Reverse, Rotate left by 3 bits, and XOR The 7 bytes of data are encrypted using this algorithm with the sub-key, as shown in FIG. 9

Figure 10:
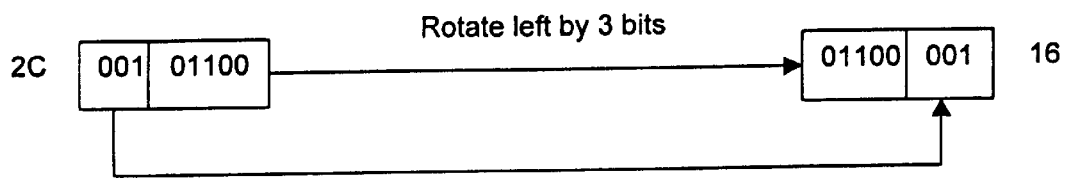
FIG. 10 provides a more detailed explanation of one of the algorithm steps of FIG. 9.

The Reverse operation simply reverses the order of the 7 data bytes. Before the operation, the order of data bytes is 2C 62 6F 42 20 69 48, and after the Reverse operation the order is 48 69 20 42 6F 62 2C The Rotate left by 3 bits operation will shift the first three bits in a data byte out and append them to the end. FIG. 10 shows, by way of example, this operation on the data byte 2C. The first three bits are shifted out and appended to the end of the rest of the bits. After the Rotate operation 2C becomes 61. For the whole data block, after the Rotate operation, the data bytes are 42 4B01 12 7B 13 61

The third operation, XOR, is an exclusive OR combination of the data with the sub-key. This is a byte-wise operation; i.e. each data byte is XORed with a sub-key byte. If the sub-key length is shorter than the data length, the whole sub-key is used again until all data bytes are XORed. Before XOR operation, the data bytes are 42 4B 01 12 7B 13 61; after the operation, they are 7A 3A CE BA E8 5C 59

Figure 11:
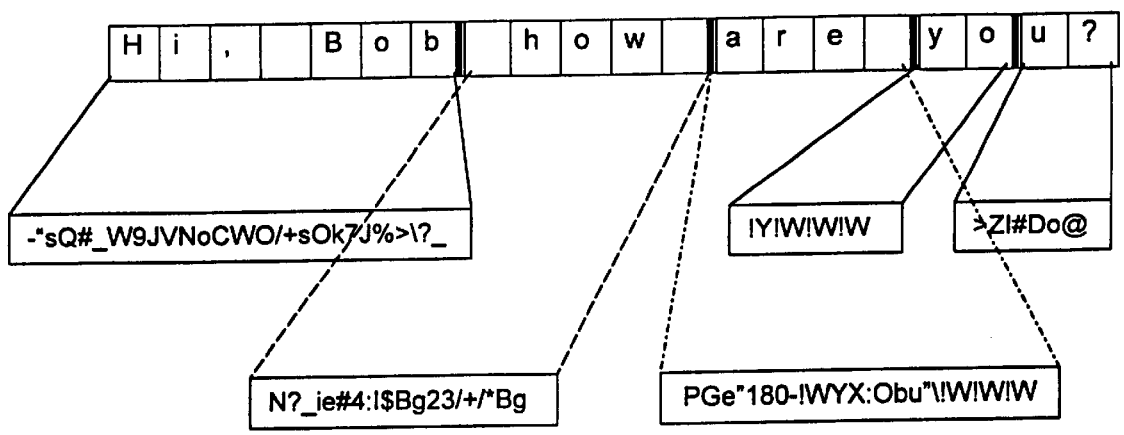
FIG. 11 illustrates the correspondence between data blocks in the original message and data blocks in the encrypted message.

The output of the XOR operation is the final output of securithm 70. The output (being part of the encrypted message) may be converted to a readable form using binary to ASCII conversion, in which case a single byte would be converted to two ASCII characters, with the result that the output of the encryption process would be a message twice as long as the original message FIG. 11 shows an overview of the process of encrypting the whole message, with data before encryption and data after encryption.

Figure 12:
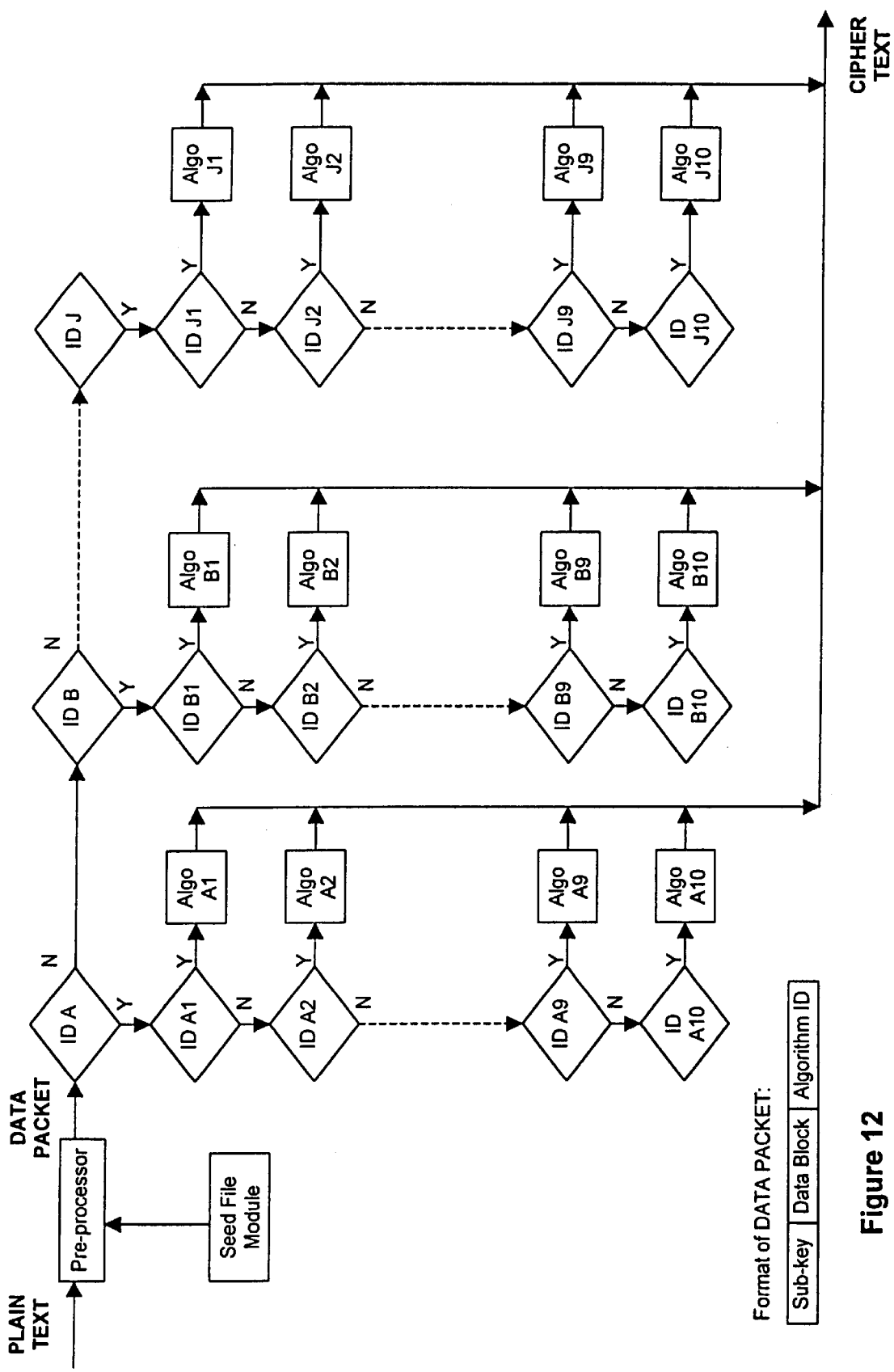
FIG. 12 is a schematic illustration of generic apparatus suitable for accomplishing the process of FIG. 1.

Referring now to FIG. 12, there is shown a generic example of hardware suitable for accomplishing the inventive encryption methods.

The plain-text message first goes into a pre-processor where the entire message is broken down into different data blocks of varying sizes. The size of each data block is determined by the parameters supplied by the seed file module. The seed file module also specifies the sub-key and the securithm to be used with a specific data block.

Each data packet at the output of the pre-processor consists of a sub-key, a data block, and a securithm ID. The securithm ID contains the identification number of the securithm to be used.

Each data packet goes through the 10 by 10 securithm matrix (columns A to J; rows 1 to 10). The securithm ID in the data packet will trigger the corresponding gates in the matrix. For example, if a data packet contains a securithm ID of A9, the gates at column A and row A9 will close. The data block within the packet will thus be encrypted using the sub-key and securithm A9, which may be a simple XOR function. The output of the algorithm matrix will be the corresponding cipher-text packet.

The securithm matrix may be either physical or conceptual. In other words, there may be a plurality of different processors, each dedicated to performing one or more different algorithms, so that different data blocks actually travel through different physical channels during encryption; or alternatively, a single processor may have the capacity to perform any one of the different algorithms which are available for encrypting data blocks, so that all data blocks travel through the same processor.

The rows and columns of the matrix need not be of equal lengths. The matrix can also be extended beyond the two dimensions depicted here.

The same processing hardware may also be applied for decryption of the cipher-text.

Whereas secure data encryption apparatus typically requires significant computation which cannot be done in real time, apparatus of the type shown in FIG. 12 may be used to encrypt and send data in real time. The apparatus may be in the form of a circuit of components or embedded circuitry in one or more devices, or implemented in software. When received the data is decrypted (possibly also in real time) and restored to its original state.

The data may be analogue or digital data from an electronic file on a storage medium, such as a processor-based system (for example a computer), or multimedia data incorporating images, sound, movies etc. from a communications device such as a communications system based on other technologies such as photonics, satellite, microwave, radio waves or computer networking.

Figure 13:
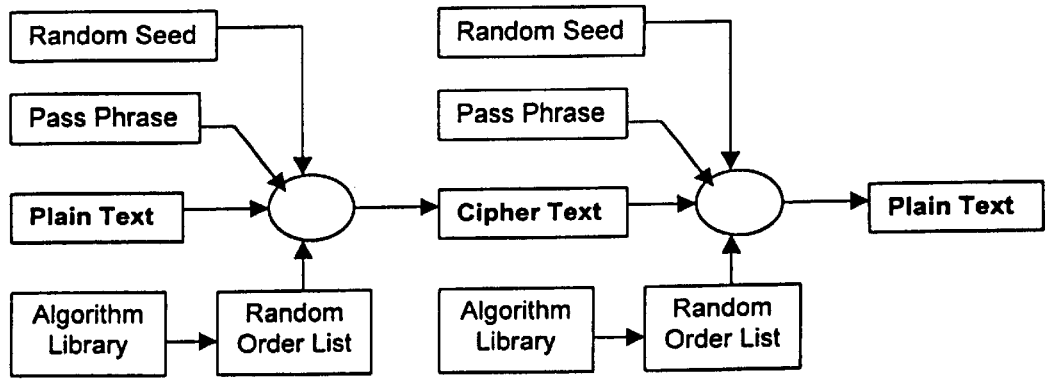
FIG. 13 is a schematic diagram of the inputs and outputs of the encrypting process of FIG. 1 and a corresponding decrypting process.

FIG. 13 provides a basic block diagram overview of the encrypting and decrypting process. Basic inputs to the encrypting process are the random seed, the pass phrase, the plain-text secret message and the algorithm library (via a random order list). The output of the encrypting process is the cipher-text.

Basic inputs to the decrypting process are the random seed, the pass phrase, the cipher-text, and the algorithm library (via the random order list). The output of the decrypting process is the plain-text secret message.

What is claimed is:

1. A method of encrypting data including the following steps:

(a) creating or selecting a master key;
   (b) segmenting the data into data blocks of equal or variable lengths;
   (c) for each data block selecting a sub-key of arbitrary starting position selected from a pre-defined set of arbitrary positions and of matched or unmatched length from the master key, said length being selected from a pre-defined set of arbitrary lengths; and
   (d) encrypting each data block using its sub-key and an encryption algorithm.

2. A method of encrypting data according to claim 1 further including the preliminary step of creating a seed, wherein the seed includes the pre-defined set of arbitrary positions and the pre-defined set of arbitrary lengths.

3. A method of encrypting data according to claim 2 including the further preliminary step of distributing the seed to a message recipient who, upon receiving the encrypted data blocks, is able to decrypt the data using the master key and the seed.

4. A method of encrypting data according to claim 3 wherein the master key and/or the seed are kept secret.

5. A method of encrypting data according to claim 3 wherein the master key and/or seed are selected from one or more binary files.

6. A method of encrypting data according to claim 2 wherein the seed further includes a pre-defined set of encryption algorithms, one of which is selected for encrypting each data block.

7. A method of encrypting data according to claim 1 wherein the data blocks are of arbitrary length.

8. A method of encrypting data according to claim 1 including, before the step of encrypting each data block, the step of selecting for each data block a specific algorithm to be used, together with that data block's sub-key, in the step of encrypting that data block.

9. A method of applying a digital signature to an electronic document, including the step of encrypting the document or a part of the document or data appended to the document according to the method of claim 1.

10. A method of encrypting data including the following steps:

(a) creating or selecting a master key;
   (b) creating a seed which includes a pre-defined set of suitable algorithms;
   (c) segmenting the data into data blocks of equal or variable lengths;
   (d) for each data block selecting an encryption algorithm from said pre-defined set of suitable algorithms;
   (e) encrypting each data block using its encryption algorithm.

11. A method of encrypting data according to claim 10 including the further preliminary step of distributing the seed to a message recipient who, upon receiving the encrypted data blocks, is able to decrypt the data using the master key and the seed.

12. A method of encrypting data according to claim 11 wherein the master key and/or the seed are kept secret.

13. A method of encrypting data according to claim 11 wherein the master key and/or seed are selected from one or more binary files.

14. A method of encrypting data according to claim 10 wherein the data blocks are of arbitrary length.

15. A method of applying a digital signature to an electronic document, including the step of encrypting the document or a part of the document or data appended to the document according to the method of claim 10.

16. A method of communicating data in a secure manner from a message transmitter to a message receiver including the following steps:
- (a) creating a seed which includes a set of arbitrary sub-key start positions, a set of arbitrary sub-key lengths, and a set of suitable encryption algorithms;
- (b) communicating the seed to the message receiver over a secured channel;
- (c) creating or selecting a master key;
- (d) communicating the master key to the message receiver over a secured channel;
- (e) dividing the data into data blocks of arbitrary length;
- (f) for each data block, selecting from the seed a sub-key start position, a sub-key length, and an encryption algorithm;
- (g) using the sub-key start position and length for each data block to derive from the master key a sub-key for that data block;
- (h) encrypting each data block using that data block's sub-key and encryption algorithm;
- (i) transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

17. A method of communicating data according to claim 16 wherein the seed and the master key are communicated to the receiver over separate secure channels.

18. Apparatus for encrypting data including:
- (a) a data block creating processor, which accepts a stream of data as its input, and outputs the data in the form of blocks;
- (b) a random selector, which selects a sub-key start position and a sub-key length;
- (c) a sub-key selector, which accepts as inputs a master key, the sub-key start position and sub-key length, and derives from these a sub-key;
- (d) an encryption processor, which accepts as inputs a sub-key and a data block, and uses the sub-key to encrypt the data block according to an encryption algorithm.

19. Apparatus for encrypting data according to claim 18 wherein the data block creating processor creates d data blocks of random lengths.

20. Apparatus for encrypting data according to claim 18 wherein the random selector also selects an encryption algorithm from a group of suitable algorithms, and the encryption processor accepts the encryption algorithm as one of its inputs.

21. Apparatus for encrypting data according to claim 18 further including a plurality of encryption processors, each embodying an encryption algorithm, wherein the random selector also selects an encryption processor, with the selected encryption processor being the processor which encrypts the data block according to its encryption algorithm.

22. Apparatus for communicating data in a secure manner from a message transmitter to a message receiver, including:
- (a) a data block creating processor, which accepts a stream of data as its input, and outputs the data in the form of blocks;
- (b) a random selector, which selects a sub-key start position, a sub-key length, and an encryption algorithm;
- (c) a sub-key selector, which accepts as inputs a master key, the sub-key start position and sub-key length, and derives from these a sub-key;
- (d) an encryption processor, which accepts as inputs a sub-key, an encryption algorithm and a data block, and uses the sub-key to encrypt the data block according to the encryption algorithm; and
- (e) apparatus for transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

23. Apparatus for communicating data in a secure manner from a message transmitter to a message receiver, including:
- (a) a data block creating processor, which accepts a stream of data as its input, and outputs the data in the form of blocks;
- (b) a plurality of encryption processors, each embodying an encryption algorithm, and each of which accepts as inputs a sub-key and a data block, and uses the sub-key to encrypt the data block according to its algorithm;
- (c) a random selector, which selects, for each data block, a sub-key start position, a sub-key length, and an encryption processor;
- (d) a sub-key selector, which accepts as inputs a master key, the sub-key start position and sub-key length, and derives from these a sub-key;

apparatus for transmitting each encrypted data block to the receiver together with a sub-key start position index number, sub-key length index number and encryption algorithm index number for each data block, enabling the receiver to derive the appropriate sub-key and encryption algorithm and thereby to decrypt the data block.

* * * * *